(12) United States Patent
Gray et al.

(10) Patent No.: US 11,349,803 B2
(45) Date of Patent: *May 31, 2022

(54) INTELLIGENT REDIRECTOR BASED ON RESOLVER TRANSPARENCY

(71) Applicant: Citrix Systems, Inc., Fort Lauderdale, FL (US)

(72) Inventors: Josh Thomas Gray, Washington County, OR (US); Steven Lyons, Lake Oswego, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,921

(22) Filed: Sep. 18, 2020

(65) Prior Publication Data

US 2021/0092089 A1    Mar. 25, 2021

Related U.S. Application Data

(63) Continuation of application No. 16/578,887, filed on Sep. 23, 2019, now Pat. No. 10,812,442.

(51) Int. Cl.
*H04L 12/00* (2006.01)
*H04L 61/4511* (2022.01)
(Continued)

(52) U.S. Cl.
CPC ...... *H04L 61/1511* (2013.01); *H04L 43/0864* (2013.01); *H04L 61/1541* (2013.01)

(58) Field of Classification Search
CPC ............. H04L 67/2814; H04L 43/0864; H04L 61/1511; H04L 67/1021; H04L 61/1541
(Continued)

(56) References Cited

U.S. PATENT DOCUMENTS 6,324,585 B1    11/2001    Zhang et al.
6,526,450 B1    2/2003    Zhang et al.
(Continued)

FOREIGN PATENT DOCUMENTS

EP    2 708 013 A1    3/2014

OTHER PUBLICATIONS

Contavalli W Van Der Gaast Google D Lawrence Akanai Technologies W. Kumari Google C: "Client Subnet in DNS Queries; rfc7871.txt", Client Subnet in DNS Queries; RFR7871.TST, Internet Engineering Task Force, IETF; Standard, Internet Society (ISOC) 4, Rue Das Falaises CH-1205 Geneva, Switzerland, May 20, 2016 (May 20, 2016), pp. 1-30, XP015112866.
(Continued)

*Primary Examiner* — Frantz Coby
(74) *Attorney, Agent, or Firm* — Foley & Lardner LLP (57) ABSTRACT

Described embodiments provide systems and methods for resolving Domain Name Service (DNS) requests. An authoritative DNS server may receive, from a recursive resolver, a DNS request to resolve a query on behalf of a client. The authoritative DNS server may determine whether the recursive resolver is classified as a non-client representative resolver or a client representative resolver. The authoritative DNS server may identify a redirect server based on the recursive resolver classified as the non-client representative resolver or the resolved server based on the recursive resolver classified as the client representative resolver. The authoritative DNS server may transmit, to the recursive resolver, a response to the DNS request including an address of one of the redirect server or the resolved server.

19 Claims, 3 Drawing Sheets

(51) Int. Cl.
*H04L 61/4541* (2022.01)
*H04L 43/0864* (2022.01)

(58) Field of Classification Search
USPC .......................................... 709/245, 229, 223
See application file for complete search history.

(56) References Cited

U.S. PATENT DOCUMENTS

| | | | |
|---|---|---|---|
| 6,553,376 | B1 | 4/2003 | Lewis et al. |
| 7,299,491 | B2 | 11/2007 | Shelest et al. |
| 7,725,602 | B2 | 5/2010 | Liu et al. |
| 7,877,510 | B2 | 1/2011 | Datta et al. |
| 8,417,824 | B2 | 4/2013 | Raciborski et al. |
| 8,489,724 | B2* | 7/2013 | Ghosh .................. H04L 43/106 709/223 |
| 8,612,564 | B2* | 12/2013 | Swildens ......... H04L 29/12066 709/223 |
| 8,626,950 | B1* | 1/2014 | MacCarthaigh .... H04L 61/1511 709/245 |
| 8,694,659 | B1* | 4/2014 | Stahl .................. H04L 61/6009 709/229 |
| 9,130,970 | B2* | 9/2015 | Carney .............. H04L 61/1511 |
| 9,231,903 | B2 | 1/2016 | Seastrom et al. |
| 9,391,949 | B1* | 7/2016 | Richardson ......... H04L 61/1511 |
| 9,565,157 | B2 | 2/2017 | Chhabra et al. |
| 9,756,019 | B2 | 9/2017 | Warrick et al. |
| 9,912,543 | B2* | 3/2018 | McPherson ............. H04L 41/12 |
| 10,148,612 | B2* | 12/2018 | Vilenski .............. H04L 61/2053 |
| 10,511,628 | B1 | 12/2019 | Richards ............. H04L 63/1408 |
| 10,812,442 | B1* | 10/2020 | Gray .................. H04L 67/2814 |
| 2003/0007482 | A1* | 1/2003 | Khello ................ H04L 29/1216 370/352 |
| 2008/0162724 | A1 | 7/2008 | Hietasarka |
| 2010/0106854 | A1 | 4/2010 | Kim et al. |
| 2011/0283359 | A1 | 11/2011 | Prince et al. |
| 2011/0302322 | A1 | 12/2011 | Raciborski et al. |
| 2014/0301191 | A1 | 10/2014 | Ludwig et al. |
| 2014/0379902 | A1* | 12/2014 | Wan ....................... H04L 43/04 709/224 |
| 2015/0350229 | A1* | 12/2015 | Mitchell ............. H04L 63/1416 726/23 |
| 2015/0358276 | A1* | 12/2015 | Liu ..................... H04L 61/1511 726/1 |
| 2016/0036763 | A1* | 2/2016 | Dempsky ............ H04L 61/1511 709/245 |
| 2017/0153980 | A1* | 6/2017 | Ara jo ................. H04L 63/0421 |
| 2017/0155678 | A1* | 6/2017 | Ara jo ................. H04L 63/1425 |
| 2020/0195669 | A1* | 6/2020 | Karasaridis ........... H04L 41/142 |
| 2020/0220840 | A1* | 7/2020 | Chen .................... H04L 67/2842 |
| 2020/0356618 | A1* | 11/2020 | Shribman ............. G06F 16/955 |

OTHER PUBLICATIONS

International Search Report and Written Opinion on PCT Appl. No. PCT/US2020/051571 dated Nov. 27, 2020.
Peterson Akamai Technologies L et al., "Framework for Content Distribution Network Interconnection (CDNI); RFC7336.txt", Framework for Content Distribution Network Interconnection (CDNI, Internet Engineering Task Force, IETF, Standard, Internet Society (ISOC) 4, Rue Des Falaises CH 1205 Geneva, Switzerland, Aug. 13, 2014 (Aug. 13, 2014), pp. 1-58, XP015104428.
Notice of Allowance on U.S. Appl. No. 16/578,887, dated Jun. 29, 2020.
International Preliminary Report on Patentability on PCT Appl. No. PCT/US2020/051571 dated Apr. 7, 2022.

* cited by examiner

INTELLIGENT REDIRECTOR BASED ON RESOLVER TRANSPARENCY

CROSS-REFERENCE TO RELATED APPLICATION

This application is a continuation of, and claims priority to and the benefit of U.S. patent application Ser. No. 16/578,887, titled "INTELLIGENT REDIRECTOR BASED ON RESOLVER TRANSPARENCY," and filed on Sep. 23, 2019, the contents of all of which are hereby incorporated herein by reference in its entirety for all purposes.

FIELD OF THE DISCLOSURE

The present application generally relates to resolving DNS requests, including but not limited to systems and methods for resolving DNS requests based on resolver transparency.

BACKGROUND

In a computing environment, a client device may request, download, or otherwise access data corresponding to a resource from a server which hosts the resource. In some instances, the client device may transmit a request to access the resource to a recursive resolver. The recursive resolver may identify an address associated with the server which hosts the resource corresponding to the request. The recursive resolver may transmit the address to the client such that the client can establish a connection with the server to access the resource.

SUMMARY

This Summary is provided to introduce a selection of concepts in a simplified form that are further described below in the Detailed Description. This Summary is not intended to identify key features or essential features, nor is it intended to limit the scope of the claims included herewith.

The following disclosure is directed to systems and methods for resolving DNS requests. This systems and methods described herein combine a granular data set segmenting global Domain Name System (DNS) resolvers into those that accurately represent a network locality of respective clients from those that do not, with a dynamic capability to either resolve DNS requests directly or send the request through a redirection service to intelligently evaluate client characteristics. According to the implementations and embodiments described herein, where a resolver well-represents clients in a particular locality, no additional computing overhead is needed for redirection. Additionally, where a client is otherwise unknown to a resolver, a DNS server can have added client visibility for optimizing redirect or resolve decisions.

Global DNS is used ubiquitously for clients of all types to find servers and services. From mobile applications, to web servers, to streaming video, to API servers, and so forth, clients universally start with a domain name (e.g., www.citrix.com) and request that that name is turned into a server address (e.g., 23.64.184.231) corresponding to the domain name such that the client can connect to the serer hosting the particular domain. To resolve the request, typically resolution servers perform a sequence of recursive queries until an authoritative answer of a particular server address is found. The resolution servers may indirectly hide the identity of the client originating the request such that an authoritative server which is resolving the request from the client is not aware of the specific client.

Some protocols include extensions (e.g., Extension mechanisms for Domain Name System (EDNS), EDNS-Client-Subnet (ECS), etc.), which may carry additional client awareness information or other client-related data during the sequence of recursive queries. However, in practice, many requests may be performed in which the client is not and cannot be known to an authoritative DNS server which is resolving requests from the client.

One approach to solving this problem is to introduce a redirection. In such an approach, the client initiates a connection with a first server before being connected to a second server (e.g., the server hosting the resource which is requested by the client). Since the client establishes a direct TCP-based connection with the first server, the first server receives the IP address for the client. Through use of the client public IP address, the server may proxy or redirect the client to the best ultimate resource server. However, such an approach has disadvantages of additional delay in establishing and/or maintaining the connection—mitigating some of the advantages of performing an optimized ultimate server selection.

Some DNS recursive resolvers seen on the public Internet today may well-represent the identity of their clients—by either being "nearby" in a network/AS/geographic sense and/or by passing EDNS/ECS information. In such instances, a redirection or proxy causes overhead in computing. As such, it may be beneficial to directly resolve the DNS to the optimal intended target server.

In one aspect, this disclosure is directed to a method. The method may include receiving, by an authoritative domain name service (DNS) server from a recursive resolver, a DNS request to resolve a query on behalf of a client. The method may include determining, by the authoritative DNS server, whether the recursive resolver is classified as a non-client representative resolver or a client representative resolver. The method may include identifying, by the authoritative DNS server, a redirect server based on the recursive resolver classified as the non-client representative resolver or the resolved server based on the recursive resolver classified as the client representative resolver. The method may include transmitting, by the authoritative DNS server, to the recursive resolver, a response to the DNS request including an address of one of the redirect server or the resolved server.

In some embodiments, determining, by the authoritative DNS server, whether the recursive resolver is classified as a non-client representative resolver or a client representative resolver includes performing a lookup in one or more data structures using an address of the recursive resolver included in the DNS request. In some embodiments, the one or more data structures include a first set of addresses associated with recursive resolvers which are classified as non-client representative resolvers and a second set of addresses associated with recursive resolvers which are classified as client representative resolvers. In some embodiments, the method further includes updating, by the authoritative DNS server, the data structure to classify further recursive resolvers as client representative resolvers and non-client representative resolvers. In some embodiments, the recursive resolver is classified as the client representative resolver or the non-client representative resolver based on at least one of 1) an Autonomous System (AS) number corresponding to the recursive resolver, 2) a ping or round-trip time for packets transmitted from the client to the authoritative DNS server or another known server, or 3) location-based information associated with an address of the recursive resolver.

In some embodiments, the recursive resolver is a first recursive resolver intermediary to the authoritative DNS server and one or more second recursive resolvers, the one or more second recursive resolvers intermediary to the first recursive resolver and the client. In some embodiments, the method further includes identifying, by the authoritative DNS server based on the recursive resolver being a client representative, a location of the client. The method may further includes selecting, by the authoritative DNS server, the resolved server based on the identified location of the client.

In some embodiments, the resolved server is one of a plurality of resolved servers. The redirect server may be configured to receive, from the client, a request to establish a connection with the redirect server. The request may include data corresponding to the client. The redirect server may be configured to select, based on a server selection policy, the resolved server from the plurality of resolved servers using the data corresponding to the client. The redirect server may be configured to transmit a response to the client to cause the client to establish a connection with the resolved server. In some embodiments, the data corresponding to the client includes data corresponding to a location of the client, and wherein the server selection policy includes one or more rules for selecting the resolved server from the plurality of resolved servers based on a proximity of the resolved server to the location of the client. In some embodiments, the redirect server is configured to perform a look-up using the data corresponding to the location of the client, in one or more data structures including data corresponding to a location the plurality of resolved servers for selecting the resolved server.

In another aspect, this disclosure is directed to a system. The system includes an authoritative domain name service (DNS) server communicably coupled to a recursive resolver. The authoritative DNS server may be configured to receive, from the recursive resolver, a DNS request to resolve a query on behalf of a client. The authoritative DNS server may be configured to determine whether the recursive resolver is classified as a non-client representative resolver or a client representative resolver. The authoritative DNS server may be configured to identify a redirect server based on the recursive resolver classified as the non-client representative resolver or the resolved server based on the recursive resolver classified as the client representative resolver. The authoritative DNS server may be configured to transmit, to the recursive resolver, a response to the DNS request including an address of one of the redirect server or the resolved server.

In some embodiments, the system further includes one or more data structures communicably coupled to the authoritative DNS server. The authoritative DNS server may configured to determine whether the recursive resolver is classified as a non-client representative resolver or a client representative resolver by performing a lookup in one or more data structures using an address of the recursive resolver included in the DNS request. In some embodiments, the one or more data structures include a first set of addresses associated with recursive resolvers which are classified as non-client representative resolvers and a second set of addresses associated with recursive resolvers which are classified as client representative resolvers. In some embodiments, the authoritative DNS server is further configured to update the data structure to classify further recursive resolvers as client representative resolvers and non-client representative resolvers. In some embodiments, the recursive resolver is classified as the client representative resolver or the non-client representative resolver based on at least one of 1) an Autonomous System (AS) number corresponding to the recursive resolver, 2) a ping or round-trip time for packets transmitted from the client to the authoritative DNS server or another known server, or 3) location-based information associated with an address of the recursive resolver.

In some embodiments, the authoritative DNS server is further configured to identify, based on the recursive resolver being a client representative, a location of the client, and select the resolved server based on the identified location of the client. In some embodiments, the resolved server is one of a plurality of resolved servers. The redirect server may be configured to receive, from the client, a request to establish a connection with the redirect server, the request including data corresponding to the client. The redirect server may be configured to select, based on a server selection policy, the resolved server from the plurality of resolved servers using the data corresponding to the client. The redirect server may be configured to transmit a response to the client to cause the client to establish a connection with the resolved server. In some embodiments, the data corresponding to the client includes data corresponding to a location of the client. The server selection policy may include one or more rules for selecting the resolved server from the plurality of resolved servers based on a proximity of the resolved server to the location of the client. The redirect server may configured to perform a look-up, using the data corresponding to the location of the client, in one or more data structures including data corresponding to a location the plurality of resolved servers for selecting the resolved server.

In yet another aspect, this disclosure is directed to a method. The method may include receiving, by an authoritative domain name service (DNS) server from a recursive resolver, a DNS request to resolve a query on behalf of a client, the recursive resolver is classified as one of a non-client representative resolver or a client representative resolver. The method may include determining, by the authoritative DNS server, that the recursive resolver is classified as a non-client representative resolver. The method may include identifying, by the authoritative DNS server responsive to determining that the recursive resolver is classified as a non-client representative resolver, an address of a redirect server. The method may include transmitting, by the authoritative DNS server to the recursive resolver, a response to the DNS request including the address of the redirect server. The redirect server may be configured to receive, from the client, a request to establish a connection with the redirect server, the request including data corresponding to the client. The redirect server may be configured to select, based on a server selection policy, a resolved server using the data corresponding to the client. The redirect server may be configured to transmit a response to the client to cause the client to establish a connection with the resolved server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements.

Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for resolving DNS requests.

A. Computing Environment

Prior to discussing the specifics of embodiments of the systems and methods detailed herein in Section B, it may be helpful to discuss the computing environments in which such embodiments may be deployed.

Figure 1:
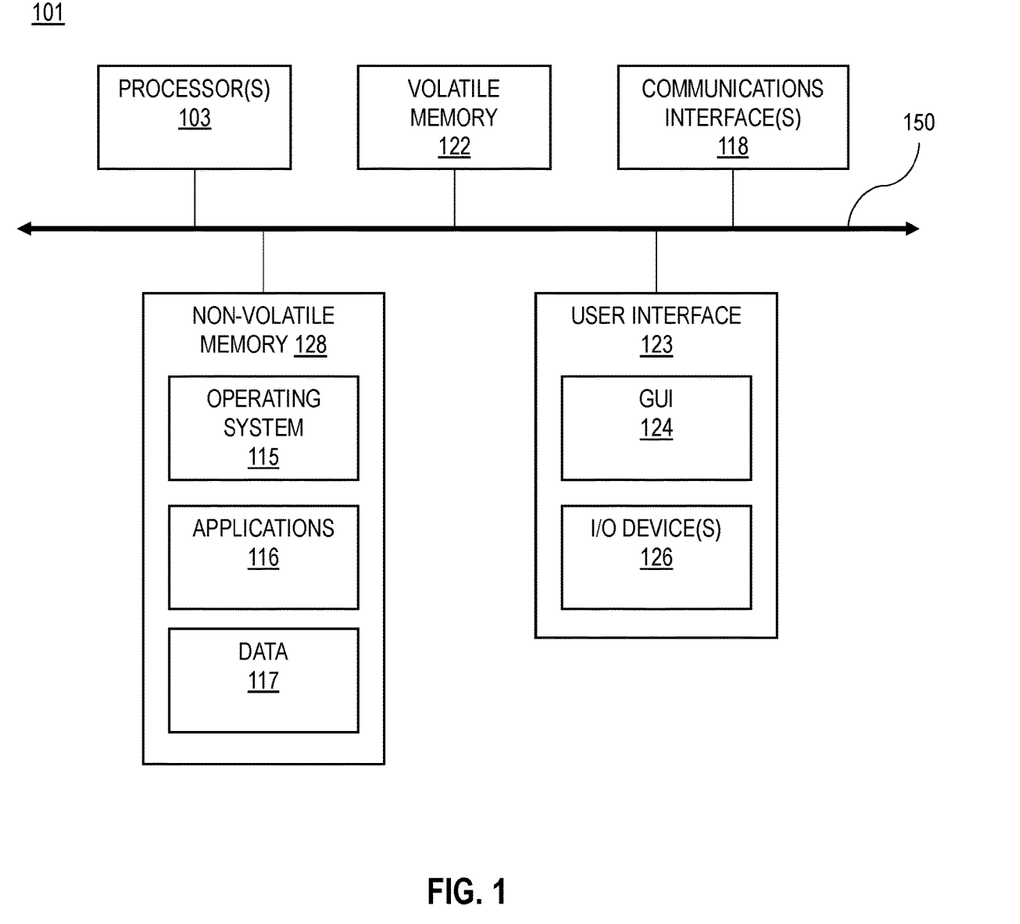
FIG. 1 is a block diagram of a network computing system, in accordance with an illustrative embodiment.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for Resolving DNS Requests

The following disclosure is directed to systems and methods for resolving Domain Name System (DNS) requests. The systems and methods described herein leverage a granular data set which segments global DNS resolvers into those that accurately represent a network locality of respective clients from those that do not. The systems and methods described herein are configured to either resolve DNS requests directly or send the request through a redirection service to intelligently evaluate client characteristics. According to the implementations and embodiments described herein, where a resolver well-represents clients in a particular locality, no additional computing overhead is needed for redirection. Additionally, where a client is otherwise unknown to a resolver, a DNS server can have added client visibility for optimizing redirect or resolve decisions.

Global DNS is used ubiquitously for clients of all types to find servers and services. From mobile applications, to web servers, to streaming video, to API servers, and so forth, clients access such resources by generating a query that includes a domain name (e.g., www.citrix.com) and a request that that name is turned into a server address (e.g., 23.64.184.231) corresponding to the domain name such that the client can connect to the server hosting the particular domain. To resolve the request, typically resolution servers perform a sequence of recursive queries until an authoritative answer of a particular server address is found. The resolution servers may indirectly hide the identity of the client originating the request such that an authoritative DNS server which is resolving the request from the client is not aware of the specific client.

Some protocols include extensions (e.g., Extension mechanisms for Domain Name System (EDNS), EDNS-Client-Subnet (ECS), etc.), which may carry additional client awareness information or other client-related data during the sequence of recursive queries. However, in practice, many requests may be performed in which the client is not and cannot be known to an authoritative DNS server which is resolving requests from the client.

One approach to solving this problem is to introduce a redirection. In such an approach, the client initiates a connection with a first server before being connected to a second server (e.g., the server hosting the resource which is requested by the client). Since the client establishes a direct TCP-based connection with the first server, the first server receives the IP address for the client. Through use of the client public IP address, the server may proxy or redirect the client to the best ultimate resource server. However, such an approach has disadvantages of additional delay in establishing and/or maintaining the connection—mitigating some of the advantages of performing an optimized ultimate server selection.

Some DNS recursive resolvers seen on the public Internet today may well-represent the identity of their clients—by either being "nearby" in a network/AS/geographic sense and/or by passing EDNS/ECS information. In such instances, a redirection or proxy causes overhead in computing. As such, it may be beneficial to directly resolve the DNS to the optimal intended target server.

Described herein are systems and methods for resolving requests from a client. An authoritative DNS server receives a DNS request from a recursive resolver. The DNS request is to resolve a query on behalf of a client. The authoritative DNS server determines whether the recursive resolver is classified as a non-client representative resolver or a client representative resolver. The authoritative DNS server identifies a redirect server based on the recursive resolver classified as the non-client representative resolver or a resolved server based on the recursive resolver classified as the client representative resolver. The authoritative DNS server transmits a response to DNS request to the recursive resolver. The response includes an address of one of the redirect server or the resolved server.

The systems and methods described herein address the visibility and optimization gap for those resolvers which do not accurately represent their clients while not inflicting overhead for those resolvers which do accurately represent their clients. The systems and methods described herein leverage data provided by client representative recursive resolvers to more expediently connect a client with a resolved server. The systems and methods described herein dynamically direct clients to resolved servers or redirect servers based on whether or not the authoritative DNS server is made aware of client information when the authoritative DNS server attempts to resolve the DNS requests. As such, the systems and methods described herein both limit computing overhead while clients are still provided access to resources in an expedient manner.

Figure 2:
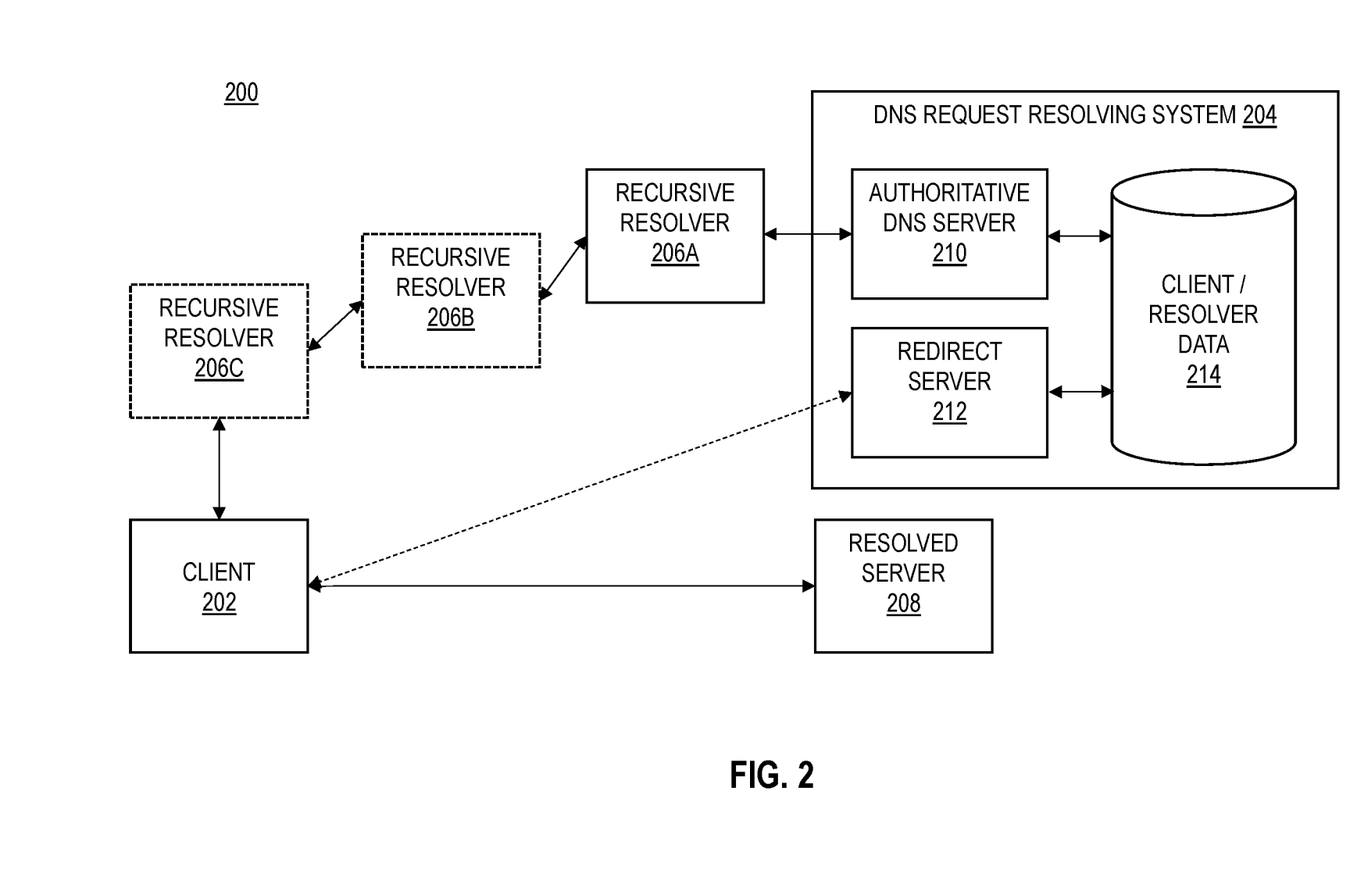
FIG. 2 is a block diagram of a system for resolving DNS requests, in accordance with an illustrative embodiment.

Referring now to FIG. 2, a system 200 for resolving DNS requests is shown, according to an illustrative embodiment. The system 200 includes a client 202, a DNS request resolving system 204, a plurality of recursive resolvers 206A-206C (referred to as recursive resolver 206) arranged intermediary to the client 202 and the DNS request resolving system 204, and a resolved server 208. The DNS request resolving system 204 includes an authoritative DNS resolver 210, a redirect server 212, and a data structure 214. As described in greater detail below, the authoritative DNS server 210 receives a DNS request from one of the recursive resolvers 206. The DNS request is to resolve a query on behalf of a client 202. The authoritative DNS server 210 determines whether the recursive resolver 206 is classified as a non-client representative resolver or a client representative resolver. The authoritative DNS server 210 identifies the redirect server 212 when the recursive resolver 206 is classified as a non-client representative resolver, or identifies the resolved server 208 when the recursive resolver 206 is classified as the client representative resolver. The authoritative DNS server 210 transmits a response (e.g., a response to the DNS request) to the recursive resolver 206. The response includes an address the redirect server 212 or the resolved server 208.

The systems and methods of the present solution may be implemented in any type and form of device, including clients, servers and/or appliances described above with reference to FIG. 1. For instance, the DNS request resolving system 204 may be implemented at a server or server bank, and the recursive resolvers 206 may be implemented on or as intermediary devices between the client 202 and the DNS request resolving system 204. The client 202 may be in a handshake with the recursive resolver(s) 206. The client 202, recursive resolver(s) 206, and DNS request resolving system 204 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

The system 200 is shown to include a client 202. The client 202 may be or include any type or form of client or computing device, such as a Personal computer (PC), laptop, desktop, a mobile device (e.g., smart phone or tablet), or other computing device configured to access one or more resources (e.g., website, application, or other content hosted on a server and otherwise available to a client). While one client 202 is shown in the system 200, it is noted that any number of clients 202 may be represented with the system 200. The client 202 may be configured to access one or more resources via the internet. The client 202 may be communicably coupled to a network, which is communicably coupled to one or more servers hosting one or more resources. The client 202 may be configured to access resources by establishing, forming, or otherwise creating a connection between a server hosting the resource and the client 202. As described in greater detail below, the client 202 may create the connection between the server hosting a particular resource by transmitting handshake information to an address associated with the server hosting the resource. Depending on the relative location of the client 202 and server, the exchange of information between the client 202 and server may be delayed or take more time. For instance, where the client 202 and server are in close geographical proximity to one another, data may be exchanged between the client 202 and server at a faster rate due to a shorter geographical distance in which the data is to travel. On the other hand, where the client 202 and server are not in close geographical proximity to one another, data may be exchanged between the client 202 and server at a slower rate due to a longer geographical distance in which the data is to travel. As such, it may be advantageous for the client 202 to establish connections to servers which are geographically closer in proximity (to the extent such servers are available and are hosting the desired resource).

The client 202 may be configured to structure, build, or otherwise generate a request. The request may be a request to resolve a DNS query (e.g., the request may be a DNS request). The client 202 may generate the request by providing a domain name corresponding to the resource which is to be accessed by the client 202. The client 202 may be configured to generate the request to indicate the domain name (e.g., "www.citrix.com") along with a request for an address of the server which hosts the resource (e.g., the domain name). In some instances (such as those in which the resource does not see a significant amount of network traffic), a single server may host the resource. In some instances (such as those in which the resource sees a significant amount of network traffic), a plurality of servers may host the resource. For instance, two or more servers may host the resource with the servers being in different geographical locations. In such instances, it may be desirable to form a connection between the client 202 and the server which is closest (geographically) to the client 202.

The client 202 may be configured to transmit, send, forward, or otherwise provide the DNS request to a recursive resolver 206. The client 202 may provide the DNS request to the recursive resolver 206 for the recursive resolver 206 to determine an address associated with the server which hosts the resource.

The system 200 is shown to include a recursive resolver 206. The recursive resolver 206 may be embodied on or a server or intermediary device. In other words, the recursive resolver 206 may be a recursive DNS server. The recursive resolver 206 is shown as being arranged intermediary between the client 202 and the DNS request resolving system 204. The client 202 may form a connection between the recursive resolver 206 by transmitting the request to an address of the recursive resolver 206 (e.g., stored at the client 202). Upon forming the connection from the client 202 and recursive resolver 206, the recursive resolver 206 may receive an IP address associated with the client 202 (or other identifying information associated with the client 202). The recursive resolver 206 is configured to respond to the request with an address associated with a server. As described in greater detail below, the address may be received from the DNS request resolving system 204, and the address may be determined based on a classification of the recursive resolver 206.

In some instances, a plurality of recursive resolvers 206 may be arranged between the client 202 and DNS request resolving system 204. For instance, the system 200 may include a first recursive resolver 206A intermediary to the DNS request resolving system 204 and the client 202, second recursive resolver 206B intermediary to the first recursive resolver 206A and the client 202, a third recursive resolver 206C intermediary to the second recursive resolver 206B and the client 202, and so forth. The system 200 may include any number of recursive resolvers 206. In some implementations, each recursive resolver 206 may be configured to perform separate tasks. For instance, one recursive resolver 206 may be configured to process requests having a particular Top Level Domain (TLD) (e.g., ".edu", ".com", ".gov", etc.). Each recursive resolver 206 may be configured to store addresses (e.g., in cache) corresponding to previously-seen resources. For instance, where a client has previously requested access to a particular domain, the recursive resolver may store an address associated with the server hosting that domain. Where the recursive resolver does not include an address associated with a server hosting a resource from a request, the recursive resolver 206 may pass the request to other recursive resolvers.

Some recursive resolvers 206 may provide information corresponding to the client 202 with the DNS request. For example, some recursive resolvers 206 may follow one or more policies or protocols for exchanging DNS requests. Some protocols may include extension which carry additional information corresponding to the client 202. As some examples, a protocol may include EDNS extensions, ECS extensions, etc. Such extensions may include client identification information (e.g., client IP address, client location provided by the client 202 with the DNS request or inferred from the client IP address, etc.). Where a recursive resolver 206 implements or uses a protocol having an extension that includes client identification information, the recursive resolver 206 may be classified as a client representative resolver (e.g., because the recursive resolver 206 represents the client to other recursive resolvers 206 and/or the authoritative DNS server 210). However, where a recursive resolver 206 implements or uses a protocol which does not include an extension that includes client identification information, the recursive resolver 206 may be classified as a non-client representative resolver (e.g., because the recursive resolver 206 conceals the client). The recursive resolvers 206 may be configured to transmit or exchange DNS requests between and through other recursive resolvers 206 along the network path between the DNS request resolving system 204 and client 202. Where the requests include accompanying client information (e.g., EDNS or ECS information/data), such accompanying client information may be passed with the request.

The system 200 is shown to include a DNS request resolving system 204. The DNS request resolving system 204 may be designed or implemented to respond to and resolve DNS requests from clients 202. The DNS request resolving system 204 is configured to receive DNS requests from clients 202 via the recursive resolvers 206. The DNS request resolving system 204 includes an authoritative DNS server 210, a redirect server 212, and a data structure 214. Both the authoritative DNS server 210 and redirect server 212 may be communicably coupled to data structure 214. As such, the authoritative DNS server 210 and redirect server 212 may both be configured to retrieve data from the data structure 214. The data structure 214 may include data corresponding to the recursive resolvers 206, clients 202, and/or resolved servers 208. As new domain names are added (e.g., by a domain name registrar), the data structure 214 may be updated to include data corresponding to the resolved server 208 which hosts the domain name. As such, the data structure 214 may include data corresponding to resources which are accessible by clients 202.

The data structure 214 may be or include a database or ledger. The data structure 214 may include various location-based information (e.g., location of certain resolved servers 208, location of clients 202 in relation to resolved servers 208, locations corresponding to certain codes within IP addresses, locations corresponding to EDNS or ECS information which may be included in DNS requests, and so forth). The data structure 214 may include classification information corresponding to recursive resolvers 206 (e.g., a ledger including an identifier or address associated with a particular recursive resolver 206 and a classification corresponding thereto). Hence, the data structure 214 may include a set of address corresponding to recursive resolvers 206 which are classified as non-client representative resolvers and a set of addresses associated with recursive resolvers 206 classified as client representative resolvers. The recursive resolvers may be classified as client representative or non-client representative based on a number of factors and considerations such as, for example, an Autonomous System (AS) number or other unique identifier corresponding to the recursive resolver, a ping or round-trip time for packets transmitted between the clients whose DNS requests are being handled by a respective recursive resolver 206 and the authoritative DNS server or another known server (e.g., indicating a distance between the clients and corresponding recursive resolver, thus indicating a relative location of the recursive resolver), location-based information associated with an address of the recursive resolver, and so forth.

Such information (including client-specific information) may be provided by the recursive resolver(s) 206 to the authoritative DNS server 210, provided to the authoritative DNS server 210 via one or more external devices or services which monitor network and backend traffic of clients with respect to recursive resolvers 206, and so forth. The authoritative DNS server 210 may be configured to classify the recursive resolvers 206 as client or non-client representative resolvers based on such information. As one example, where the authoritative DNS server 210 receives information (e.g., from a recursive resolver 206 or from one or more external devices or services monitoring clients 202 behind a recursive resolver 206) which indicates that a recursive resolver 206 is handling requests from clients 202 that span a large geographical location, the authoritative DNS server 210 may determine that the recursive resolver 206 is a non-client representative resolver. As another example, where the authoritative DNS server 210 receives information (e.g., from a recursive resolver 206 or from one or more external devices or services monitoring clients 202 behind a recursive resolver 206) which indicates that there is a wide variation in round-trip time performance for clients 202 which are providing requests handled by a recursive resolver 206, the authoritative DNS server 210 may determine that the recursive resolver 206 is a non-client representative resolver.

The data structure 214 may be updated, revised, modified, and/or written to by the authoritative DNS server 210 and/or the redirect server 212. In some implementations, the data structure 214 may be updated at regular intervals (e.g., once an hour, once a day, once a week, once a month, etc.). The data structure 214 may be updated when a recursive resolver 206 changes protocols in which DNS requests are transmitted (e.g., from a protocol which does not include an ENDS/ECS extension to a protocol which includes an EDNS/ECS extension). The data structure 214 may be updated when requests are received from recursive resolvers 206 (e.g., the DNS request is formatted according to a protocol having an extension including client information or the DNS request is accompanied by client information). The data structure 214 may be updated to indicate changes in classification of recursive resolvers 206, to include additional or new resolved server addresses, to include new associations with domain names and corresponding addresses of resolved servers, etc.

The authoritative DNS server 210 is configured to receive DNS requests from the recursive resolver(s) 206. The DNS requests may be requests to resolve queries on behalf of the client 202. The authoritative DNS server 210 may be configured to receive DNS requests from both client representative recursive resolvers 206 and non-client representative recursive resolvers 206. The DNS requests from the client and non-client representative recursive resolvers 206 may be similarly structured. However, as described above, depending on the classification of the recursive resolver 206, the DNS request may or may not include accompanying information corresponding to clients (e.g., EDNS or ECS data or information).

The authoritative DNS server 210 may be configured to determine whether the recursive resolver 206 (which transmitted the DNS request which is received by the authoritative DNS server 210) is classified as a non-client representative resolver or a client representative resolver. In some implementations, the authoritative DNS server 210 determines the classification of the recursive resolver 206 using data from the data structure 214. The authoritative DNS server 210 may be configured to perform a look-up using an address of the recursive resolver 206 in the data structure 214. As stated above, the data structure 214 may include data corresponding to recursive resolvers 206 and their corresponding classification. The authoritative DNS server 210 may be configured to perform the look-up using the address as an input for determining the classification of the recursive resolver 206. In some implementations, the authoritative DNS server 210 may be configured to determine the classification of the recursive resolver 206 based on the DNS request received from the recursive resolver 206. The DNS request may include an accompanying packet containing client information. The packet may be generated by the recursive resolver 206 which received the DNS request from the client 202. The authoritative DNS server 210 may receive the DNS request and accompanying packet. The authoritative DNS server 210 may be configured to determine the classification based on the data included in the accompanying packet (e.g., where the accompanying packet includes client information, the authoritative DNS server 210 may determine the classification of the recursive resolver as a client representative resolver).

The authoritative DNS server 210 is configured to identify a server. The authoritative DNS server 210 may be configured to identify the server based on the classification of the recursive resolver 206. For instance, the authoritative DNS server 210 may be configured to identify a redirect server 212 based on the recursive resolver 206 being classified as the non-client representative resolver. On the other hand, the authoritative DNS server 210 may be configured to identify the resolved server 208 when the recursive resolver 206 is classified as a client representative resolver.

The authoritative DNS server 210 may be configured to identify the redirect server 212 when the recursive resolver 206 is classified as a non-client representative resolver. Since the authoritative DNS server 210 does not have any information corresponding to the client when attempting to resolve the DNS request, the authoritative DNS server 210 may not be capable of intelligently resolving the request and selecting an optimized server. Therefore, the authoritative DNS server 210 may respond to the DNS request from the recursive resolver 206 with an address of the redirect server 212. The response may be propagated back to the client 202, which then establishes a connection with the redirect server 212.

The client 202 is configured to form, generate, or otherwise establish a connection between the client 202 and the redirect server 212. When the client 202 establishes a connection with redirect server 212, the redirect server 212 is receives (and is thus made aware of) the IP address for the client 202. The redirect server 212 is configured to leverage the IP address for determining a location of the client 202. The redirect server 212 may be configured to use, access, or otherwise apply a server selection policy for selecting a resolved server 208. The server selection policy may be a policy which specifies a hierarchy or set of rules for selecting a resolved server 208 for which the client 202 is to connect for accessing a resource or domain. The server selection policy may specify that, where there is one server which hosts the resource or domain, the redirect server 212 is to select the one server that hosts the resource or domain. The server selection policy may specify that, where there is more than one server which hosts the resource or domain, the redirect server 212 is to determine the location of the client 202, determine the location of the servers hosting the resource or domain, and select one of the servers as the resolved server 208 based on which server is in closest proximity to the client 202. The server selection policy may specify other rules, such as rules based on current traffic handled by servers, for instance.

The redirect server 212 may be configured to apply the server selection policy to the DNS request from the client for selecting the resolved server 208. Where a plurality of servers host the resource or domain, the redirect server 212 may be configured to perform a look-up in the data structure 214 using the location of the client 202 and the domain name for the resource for identifying the resolved server 208 which is closest to the client 202. In other words, the redirect server 212 selects a resolved server 208 based on the location of the client 202 (e.g., resolved server 208 which is closest to the client 202). The redirect server 212 is configured to transmit a response to the client 202 which includes an address of the resolved server 208. The client 202 can then establish a connection with the resolved server 208 for accessing the resource or domain from the DNS query.

In some instances, the authoritative DNS server 210 may be configured to directly identify the resolved server 208 when the recursive resolver 206 is classified as a client representative resolver. Where the recursive resolver 206 is classified as a client representative resolver, the recursive resolver 206 provides the DNS request and the accompanying client information to the authoritative DNS server 210 (e.g., in accordance with the EDNS/ECS extension of the policy). The authoritative DNS server 210 may be configured to use the client information (e.g., client IP address, client location, etc.) for determining a location of the client 202. Similar to the redirect server 212, the authoritative DNS server 210 may be configured to apply the server selection policy to the DNS request for identifying the resolved server 208. The authoritative DNS server 210 may be configured to perform a look-up of the location of the client 202 for determining, selecting, or otherwise identifying the resolved server 208 (e.g., the resolved server 208 which is closest to the client 202). The authoritative DNS server 210 may be configured to respond to the DNS request from the recursive resolver 206 with an address of the resolved server 208. The recursive resolver 206 then propagates the response from the authoritative DNS server 210 to the client 202 such that the client 202 then is able to establish a connection between the client 202 and the resolved server. Such implementations and embodiments effectively bypass the redirect server 212, thus delivering content from the resolved server 208 to the client 202 in a more expedited manner.

Figure 3:
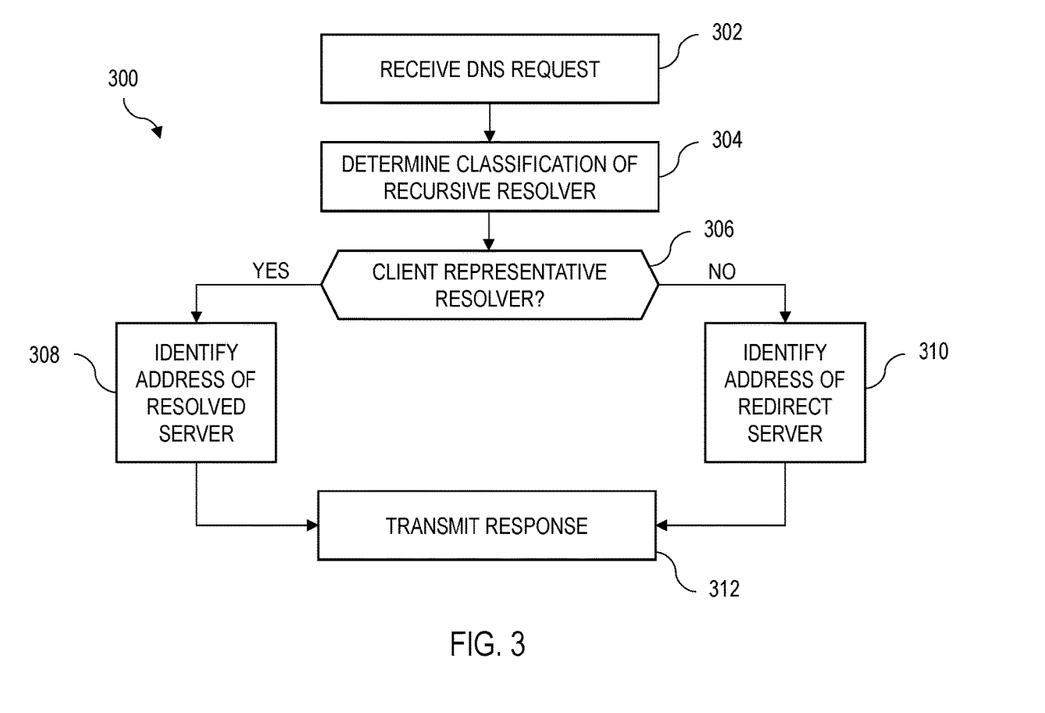
FIG. 3 is a flow chart showing a method of resolving DNS requests, in accordance with an illustrative embodiment.

Referring now to FIG. 3, depicted is a flow diagram for a method 300 of resolving DNS requests. The functionalities of method 300 may be implemented using, or performed by, the components described in FIGS. 1-2, such as the client 202, recursive resolvers 206, DNS request resolving system 204 including components thereof (e.g., the authoritative DNS server 210, the redirect server 212, and/or data structure 214). In brief overview, at step 302, the authoritative DNS server receives a request. At step 304, the authoritative DNS server determines a classification of a recursive resolver. At step 306, the authoritative DNS server determines whether the recursive resolver is a client representative resolver. At step 308, where the recursive resolver is classified as a client representative resolver, the authoritative DNS server identifies an address of a resolved server. At step 310, where the recursive resolver is classified as a non-client representative resolver, the authoritative DNS server identifies an address of the redirect server. At step 312, the authoritative DNS server transmits a response.

At step 302, the authoritative DNS server receives a request. In some embodiments, the authoritative DNS server receives a request from a recursive resolver. The request may be a DNS request to resolve a query on behalf of a client. In some implementations, the recursive resolver may be a first recursive resolver intermediary to the authoritative DNS server and one or more second recursive resolvers, and the one or more second recursive resolvers intermediary to the first recursive resolver and the client. The client may transmit a DNS request to a recursive resolver for resolving a request to access a resource hosted on a server. The DNS request generated by the client may include a domain name (e.g., "www.citrix.com") along with a request for an address to a server which hosts the domain name. The recursive resolver may receive the request from the client. The recursive resolver may attempt to resolve the request by performing a look-up in cache (e.g., for the recursive resolver). Where the recursive resolver cannot resolve the request, the recursive resolver may pass the request to other recursive resolvers and, finally, to the authoritative DNS server.

Some recursive resolvers may follow one or more policies or protocols for incorporating information or data into the request. For instance, a recursive resolver may follow a protocol which includes an extension (e.g., EDNS extensions, ECS extensions, etc.) which includes client information with the request. Such recursive resolvers may be classified as client representative resolvers. The recursive resolvers which do not follow a protocol which includes an extension including client information with the request may be classified as non-client representative resolvers. The recursive resolvers may be classified as client representative resolvers or non-client representative resolvers based on an AS number corresponding to the recursive resolver, a ping or round-trip time for packets transmitted from the recursive resolver to a known server (e.g., the authoritative DNS server or other known server), or location-based information associated with an address (e.g., an IP address) of the recursive resolver.

At step 304, the authoritative DNS server determines a classification of a recursive resolver. The authoritative DNS server may determine the classification of the recursive resolver based on the request received from the recursive resolver. In some embodiments, the authoritative DNS server may determine whether the recursive resolver is classified as a client representative resolver or non-client representative resolver. The authoritative DNS server may determine the classification of the recursive resolver by performing a lookup in one or more data structures using an address of the recursive resolver included in the DNS request. The data structure(s) may include a first set of addresses associated with recursive resolvers which are classified as non-client representative resolvers and a second set of addresses associated with recursive resolvers which are classified as client representative resolvers. The authoritative DNS server may update, revise, or maintain the data structure. The authoritative DNS server may update the data structure to classify further recursive resolvers at various intervals, based on data received from such recursive resolvers (e.g., based on subsequent requests from recursive resolvers indicating an update in protocol for those recursive resolvers, based on an update signal from recursive resolvers), and so forth.

The authoritative DNS server may perform a look-up using an address of the recursive resolver in the data structure for determining the classification of the recursive resolver. In some implementations, the authoritative DNS server may determine the classification of the recursive resolver based on the DNS request. For instance, the DNS request may be structured differently based on the classification of the recursive resolver (e.g., the DNS request may include accompanying information corresponding to the client, which indicates the recursive resolver is classified as a client representative resolver).

At step 306, the authoritative DNS server determines whether the recursive resolver is a client representative resolver. The authoritative DNS server may determine whether the recursive resolver is a client representative resolver based on the look-up in the data structure. The authoritative DNS server may determine the recursive resolver is classified as a client representative resolver based on data included in the data structure which indicates the classification of the recursive resolver. As stated above, the data structure may include data which includes sets of addresses corresponding to recursive resolvers classified as client representative resolvers and addresses corresponding to recursive resolvers classified as non-client representative resolvers. The authoritative DNS server may determine whether the recursive resolver is classified as a client representative resolver based on if an address for the recursive resolver is included in the set of addresses corresponding to client representative resolvers. Where the recursive resolver is classified as a client representative resolver, the method 300 may proceed to step 308. However, where the recursive resolver is classified as a non-client representative resolver, the method 300 may proceed to step 310.

At step 308, where the recursive resolver is classified as a client representative resolver, the authoritative DNS server identifies an address of a resolved server. In some embodiments, the authoritative DNS server identifies a resolved server for responding to the request (e.g., received at step 302). The authoritative DNS server may identify the resolved server by identifying a location of the client. The authoritative DNS server may identify the location of the client based on client information included in the request (e.g., received at step 302). The client information may include an IP address for the client. The authoritative DNS server may determine a location of the client based on one or more values included in or corresponding to the IP address. The authoritative DNS server may thus determine the location of the client based on data included in the request and corresponding to the client. The authoritative DNS server may select the resolved server based on the identified location of the client. Where the resource corresponding to the request is hosted by a plurality of servers, the authoritative DNS server may select the resolved server from the plurality of servers. The authoritative DNS server may select the resolved server based on a location of the client and a location of the plurality of servers (e.g., which of the plurality of servers is located closest to the location of the client).

At step 310, where the recursive resolver is classified as a non-client representative resolver, the authoritative DNS server identifies an address of the redirect server. The authoritative DNS server may identify the address of the redirect server so that the redirect server can direct the client to an optimized resolve server. As described in greater detail below with reference to FIG. 4, the redirect server may identify a resolved server when the redirect server receives a subsequent request from the client for a connection.

At step 312, the authoritative DNS server transmits a response. In some embodiments, the authoritative DNS server transmits a response to the DNS request. The authoritative DNS server may transmit the response to the recursive resolver which transmitted the request received by the authoritative DNS server (e.g., received at step 302). The response may be a response to the DNS request including an address of one of the redirect server or the resolved server. The authoritative DNS server may include an address of the redirect server (e.g., identified at step 310) or an address of the resolved server (e.g., identified at step 308) in the response. The authoritative DNS server may include the address of the redirect server or resolved server depending on whether or not the recursive resolver is classified as a non-client representative resolver or client representative resolver, respectively. The recursive resolver may transmit the response to the client (e.g., either directly to the client or through one or more other recursive resolvers). The client may initiate, establish, or otherwise form a connection between the server corresponding to address (e.g., the redirect server or resolved server). Where the client initiates a connection with the resolved server, the client may access the resource or data hosted on the resolved server. Where the client initiates a connection with the redirect server, the client may subsequently be directed to the resolved server for accessing the resource or data hosted thereon, as described in greater detail below with reference to FIG. 4.

Figure 4:
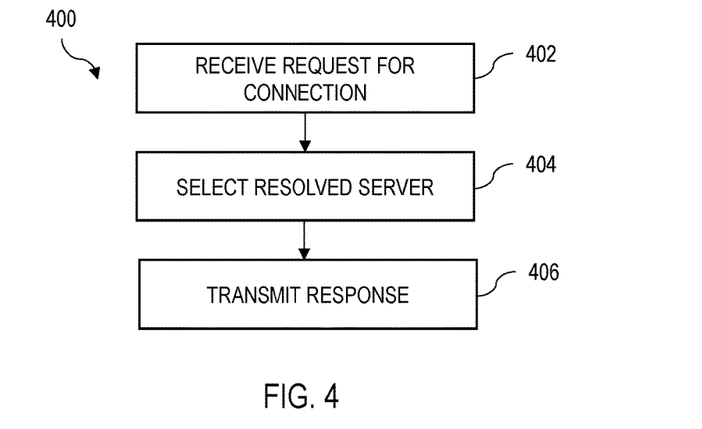
FIG. 4 is a flow chart showing a method of resolving DNS requests, in accordance with an illustrative embodiment.

Referring now to FIG. 4, depicted is a flow diagram for a method 400 of resolving DNS requests. The functionalities of method 400 may be implemented using, or performed by, the components described in FIGS. 1-2, such as the client 202, recursive resolvers 206, DNS request resolving system 204 including components thereof (e.g., the authoritative DNS server 210, the redirect server 212, and/or data structure 214). In brief overview, at step 402, the redirect server receives a request for connection. At step 404, the redirect server selects a resolved server. At step 406, the redirect server transmits a response.

At step 402, the redirect server receives a request for connection. In some embodiments, the redirect server receives a request to establish a connection from the client. The redirect server may receive a request which includes data corresponding to the client. The request may be similar to the request received by the authoritative DNS server at step 302 in FIG. 3. The request may include a domain name and a request for a server address. The data may include data corresponding to a location of the client. For instance, the data may be or include an IP address associated with the client. The redirect server may determine a location associated with the client based on the IP address. As described in greater detail above with reference to FIG. 3, the IP address may include data which corresponds to a location of the client. The redirect server may parse the IP address to determine a location of the client.

At step 404, the redirect server selects a resolved server. In some embodiments, the redirect server may select the resolved server based on a server selection policy. The redirect server may apply the server selection policy to the request to select the resolved server from a plurality of resolved server. The server selection policy may include one or more rules for selecting the resolved server from the plurality of resolved servers based on a proximity of the resolved server to the location of the client. As an example, the server selection policy may include a rule which indicates that, when the resource is hosted on a single server, the redirect server is to select the resolved server which hosts the resource. As another example, the server selection policy may include a rule which specifies selection of a resolved server (from a plurality of resolved servers) which is in closest proximity to the client. The data structure may store data corresponding to a location of the resolved servers. The redirect server may perform a look-up in the data structure to identify the resolved server which is closest to the client. The redirect server may identify an address of the selected resolved server within the data structure.

At step 406, the redirect server transmits a response. In some embodiments, the redirect server transmits a response to the client to cause the client to establish a connection with the resolved server. The response may be a response to the request (e.g., received at step 402). The redirect server may include the address of the selected resolved server in the response. The client may receive the response from the redirect server. The client may parse the response from the redirect server to extract the address corresponding to the resolved server. The client may establish a connection with the resolved server using the address included in the response from the redirect server. The client may then retrieve, access, or otherwise use data corresponding to the resource hosted on the resolved server.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
    receiving, by a device, a request to resolve a domain name, the request originating from a client;
    determining, by the device, that a recursive resolver conceals identification of the client;
    identifying, by the device, a first server instead of a resolved server responsive to the determination, the first server configured to resolve requests for domain names using identification information received by the first server from the client, and
    transmitting, by the device, a response to the request, the response identifies the first server.

2. The method of claim 1, further comprising determining, by an authoritative domain name service, a classification of the recursive resolver.

3. The method of claim 1, further comprising determining, by the device, that the recursive resolver is classified as a non-client representative resolver.

4. The method of claim 3, further comprising classifying the recursive resolver based at least on round trip times of packets communicated with the recursive resolver.

5. The method of claim 3, further comprising classifying recursive resolver based at least on location information associated with an address of the recursive resolver.

6. The method of claim 1, further comprising determining, by the device, that a protocol used by the recursive resolver excludes information identifying the client.

7. The method of claim 1, further comprising transmitting, by the device, the response to the request to cause the client to request a connection to the first server, wherein the first server is configured to cause the client to establish the connection with the resolved server for the domain name.

8. A method comprising:
    receiving, by a device, a request to resolve a domain name, the request originating from a client;
    determining, by the device, that a recursive resolver provides information identifying the client to other recursive resolvers;
    identifying, by the device, a resolved server instead of a redirect server based on the determination, and
    transmitting, by the device, a response to the request, the response identifies the resolved server.

9. The method of claim 8, further comprising determining, by an authoritative domain name service, a classification of the recursive resolver.

10. The method of claim 8, further comprising determining, by the device, that the recursive resolver is classified as a client representative resolver.

11. The method of claim 10, further comprising classifying the recursive resolver based at least on round trip times of packets communicated with the recursive resolver.

12. The method of claim 10, further comprising classifying recursive resolver based at least on location information associated with an address of the recursive resolver.

13. The method of claim 8, further comprising transmitting, by the device, the response to the request to cause the client to request a connection with the resolved server.

14. A system comprising:
    one or more processors, coupled to memory and configured to:
        receive a request to resolve a domain name, the request originating from a client;
        determine that a recursive resolver has been classified either as representing the client to other recursive resolvers or as concealing identification of the client;
        identify a server from a redirect server or a resolved server based at least on the classification of the recursive resolver; and
        transmit a response to the request identifying an address of the server.

15. The system of claim 14, wherein the one or more processors are further configured to identify the redirect server as the server based on classifying the recursive resolver as representing the client to other recursive resolvers.

16. The system of claim 14, wherein the one or more processors are further configured to identify the resolved server as the server based on classifying the recursive resolver as concealing identification of the client.

17. The system of claim 14, wherein the one or more processors are further configured to classify the recursive resolver based at least on round trip times of packets communicated with the recursive resolver.

18. The system of claim 14, wherein the one or more processors are further configured to classify the recursive resolver based at least on location information associated with an address of the recursive resolver.

19. The system of claim 14, wherein the one or more processors are further configured to classify the recursive resolver based at least on an autonomous system number corresponding to the recursive resolver.

* * * * *